UNITED STATES PATENT OFFICE.

JAMES S. WATTS, OF BALTIMORE, AND LUNSFORD G. WATTS, OF PIKESVILLE, MARYLAND.

ARTIFICIAL STONE.

SPECIFICATION forming part of Letters Patent No. 282,426, dated July 31, 1883.

Application filed February 3, 1883. (No specimens.)

*To all whom it may concern:*

Be it known that we, JAMES S. WATTS and LUNSFORD G. WATTS, citizens of the United States, residing, respectively, at Baltimore city and Pikesville, Baltimore county, Maryland, have invented a certain new and useful Improvement in Artificial Stone, of which the following is a specification.

We take one part of Portland cement, if a light-colored stone is desired, or one part of Rosendale cement, if a dark-colored stone is desired, and two parts of sand, and mix them thoroughly in a dry state. We also take equal parts, by measure, of corn and wheat in the grain, and, adding four times as much water, we boil the mixture down until it contains a quantity equal to half the water used. This we call our "solution." We dilute this solution by adding to one part of it thirty-two parts of water. We now add to the mixture of sand and cement sufficient of this dilute solution to moisten it just enough to permit of tamping it in wooden or other molds. The mass is now tamped in the molds and at once taken out, the block being removed from the mold, or the mold taken away from the block, after which the block is dampened once a day for four successive days with the dilute solution, and then allowed to dry, which for ordinary building-stone takes about six days, and for stone which is to receive a brilliant polish about twenty days.

We have found by actual experiment that our stone thus made will stand a very great amount of either heat or cold and remain firm and hard, neither cracking, crumbling, blistering, nor in any manner deteriorating or disintegrating, and will take as brilliant a polish as any of the natural stones. It is extremely cheap to manufacture, and contains nothing to fade any desired coloring-matter which may be introduced for ornamental purposes.

Having thus fully described our invention, what we claim as new, and desire to secure by Letters Patent, is—

The herein-described artificial stone, consisting of cement, sand, wheat, corn, and water, in the proportions described.

In witness whereof we have hereunto set our hands.

JAMES S. WATTS.
LUNSFORD G. WATTS.

Witnesses:
  JNO. T. MADDOX,
  S. BRASHEARS.